(12) United States Patent
Cousins et al.

(10) Patent No.: US 9,624,846 B2
(45) Date of Patent: Apr. 18, 2017

(54) MANUAL TRANSMISSION ACTIVE SPEED MATCHING

(71) Applicant: GM Global Technology Operations LLC, Detroit, MI (US)

(72) Inventors: William L. Cousins, Ortonville, MI (US); Bradford W. Bur, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 14/660,362

(22) Filed: Mar. 17, 2015

(65) Prior Publication Data

US 2016/0273461 A1  Sep. 22, 2016

(51) Int. Cl.
```
F02D 29/02    (2006.01)
F02D 41/02    (2006.01)
F16H 63/50    (2006.01)
F16H 63/40    (2006.01)
```

(52) U.S. Cl.
CPC .......... *F02D 29/02* (2013.01); *F02D 41/023* (2013.01); *F16H 63/40* (2013.01); *F16H 63/502* (2013.01); *F02D 2200/501* (2013.01); *F02D 2200/602* (2013.01); *F02D 2200/606* (2013.01); *F16H 2306/20* (2013.01)

(58) Field of Classification Search
None
See application file for complete search history.

(56) References Cited

U.S. PATENT DOCUMENTS

| | | | | |
|---|---|---|---|---|
| 6,015,364 A | * | 1/2000 | Le Van | B60K 28/165 180/197 |
| 6,231,479 B1 | * | 5/2001 | Kraska | F16H 61/061 477/143 |
| 6,352,492 B1 | * | 3/2002 | Steeby | B60W 10/06 477/109 |
| 8,739,647 B2 | | 6/2014 | Benson et al. | |
| 2003/0019709 A1 | * | 1/2003 | Katou | B60W 10/06 192/35 |
| 2010/0211254 A1 | * | 8/2010 | Kimura | F02D 29/02 701/31.4 |

* cited by examiner

*Primary Examiner* — Colby M Hansen

(57) ABSTRACT

In a vehicle having a manual transmission, various sensors such as pedal and gearshift position sensors and accelerometers provide data to a control module such as an engine control module. The control module includes a microprocessor which calculates derivatives, i.e., the rate of change (first derivative) or the rate of change of the rate of change (second derivative) of the data from the sensors. Based on these derivatives, the microprocessor classifies the current driving activity into one of two, three or more modes, for example, track, sport and touring. During a shift, from the data from the gearshift sensor, the microprocessor determines whether an upshift or downshift is imminent or in progress and decreases or increases the engine speed to achieve zero or negligible cross clutch speed differential upon clutch engagement, rapidly if in the first (track) mode, less rapidly in the second (sport) mode and less rapidly still in the third (touring) mode.

17 Claims, 3 Drawing Sheets

MANUAL TRANSMISSION ACTIVE SPEED MATCHING

FIELD

The present disclosure relates to manual transmission control systems and more particularly to a manual transmission control system and method which adjust a rate of clutch engagement to the current style of driving of the vehicle operator.

BACKGROUND

The statements in this section merely provide background information related to the present disclosure and may or may not constitute prior art.

Manual motor vehicle transmissions have always been prized by driving enthusiasts for both their objective performance and their contribution to the subjective experience of driving. This is not to say, however, that certain aspects of manual transmissions cannot be improved by the application of modern computer and microprocessor technology.

A particularly beneficial application of technology involves shaft speed and clutch control and the concept of matching the clutch input speed, that is, the engine output speed, to the transmission input speed when the clutch is about to be closed to engage a new selected gear. Such speed or rev matching improves shift quality and greatly enhances the service life of the clutch.

Unfortunately, it is often necessary to substantially and rapidly increase or decrease the engine speed prior to clutch closure to achieve such zero cross clutch speed differential. When the vehicle is being driven in a aggressive, sporty manner such a rapid speed change may both be necessary and unnoticed but when this same speed change, especially a commanded rapid speed increase, occurs during casual driving it can be both disconcerting and annoying to the driver.

Accordingly, an engine control system that matches the rate of engine speed increase or decrease prior to clutch closure to the current style of driving, that is, competitive, aggressive, conventional or casual, for example, to achieve zero cross clutch speed differential would be desirable. The present invention is so directed.

SUMMARY

The present invention provides a variable speed or rev matching control system and method that matches the rate of engine speed increase or decrease to the current style of driving to achieve zero or negligible cross clutch speed differential at the moment of clutch engagement. As used throughout this document, it should be understood that the term "rev matching" is a shortened or abbreviated term meaning matching revolutions per minute of two rotating components, in this case, the output shaft speed of an engine with the input shaft speed of a manual transmission. In a vehicle having a manual transmission, various sensors such as pedal and gearshift position sensors and accelerometers provide data to a control module such as an engine control module. The control module includes a microprocessor which calculates derivatives, i.e., the rate of change (first derivative) or the rate of change of the rate of change (second derivative) or higher derivatives of the data from certain sensors. Based on these derivatives, the microprocessor classifies the current driving activity into one of two, three or more modes, for example, track, sport and touring.

During a shift, from the data from the gearshift sensor, the microprocessor determines whether an upshift or downshift is imminent or in progress and decreases or increases the engine speed to achieve zero or negligible cross clutch speed differential upon clutch engagement, rapidly if in the first (track) mode, less rapidly in the second (sport) mode and less rapidly still in the third (touring) mode.

Thus it is an aspect of the present invention to provide a variable rev or speed matching control system that matches the rate of engine speed increase or decrease to the current style of driving to achieve zero or negligible cross clutch speed differential at the moment of clutch engagement.

It is a further aspect of the present invention to provide a variable rev or speed matching control method that matches the rate of engine speed increase or decrease to the current style of driving to achieve zero or negligible cross clutch speed differential at the moment of clutch engagement.

It is a still further aspect of the present invention to provide a variable rev matching control system that includes various sensors such as pedal and gearshift position sensors and accelerometers to provide data to a control module.

It is a still further aspect of the present invention to provide a variable rev matching control system that includes various sensors such as pedal and gearshift position sensors and accelerometers to provide data to a control module such as an engine control module (ECM) having a microprocessor.

It is a still further aspect of the present invention to provide a variable rev matching control system that includes a microprocessor which calculates a derivative, i.e., the rate of change (first derivative) or the rate of change of the rate of change (second derivative) or higher derivatives of the data from certain sensors.

It is a still further aspect of the present invention to provide a variable rev matching control system that includes a microprocessor that classifies the current driving activity into one of two, three or more modes, for example, track, sport and touring.

It is a still further aspect of the present invention to provide a variable rev matching control system that includes a microprocessor that determines whether an upshift or downshift is imminent or in progress and decreases or increases the engine speed to achieve zero cross clutch speed differential upon clutch engagement, rapidly if in a first (track) mode, less rapidly in a second (sport) mode and less rapidly still in a third (touring) mode.

Further advantages, aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
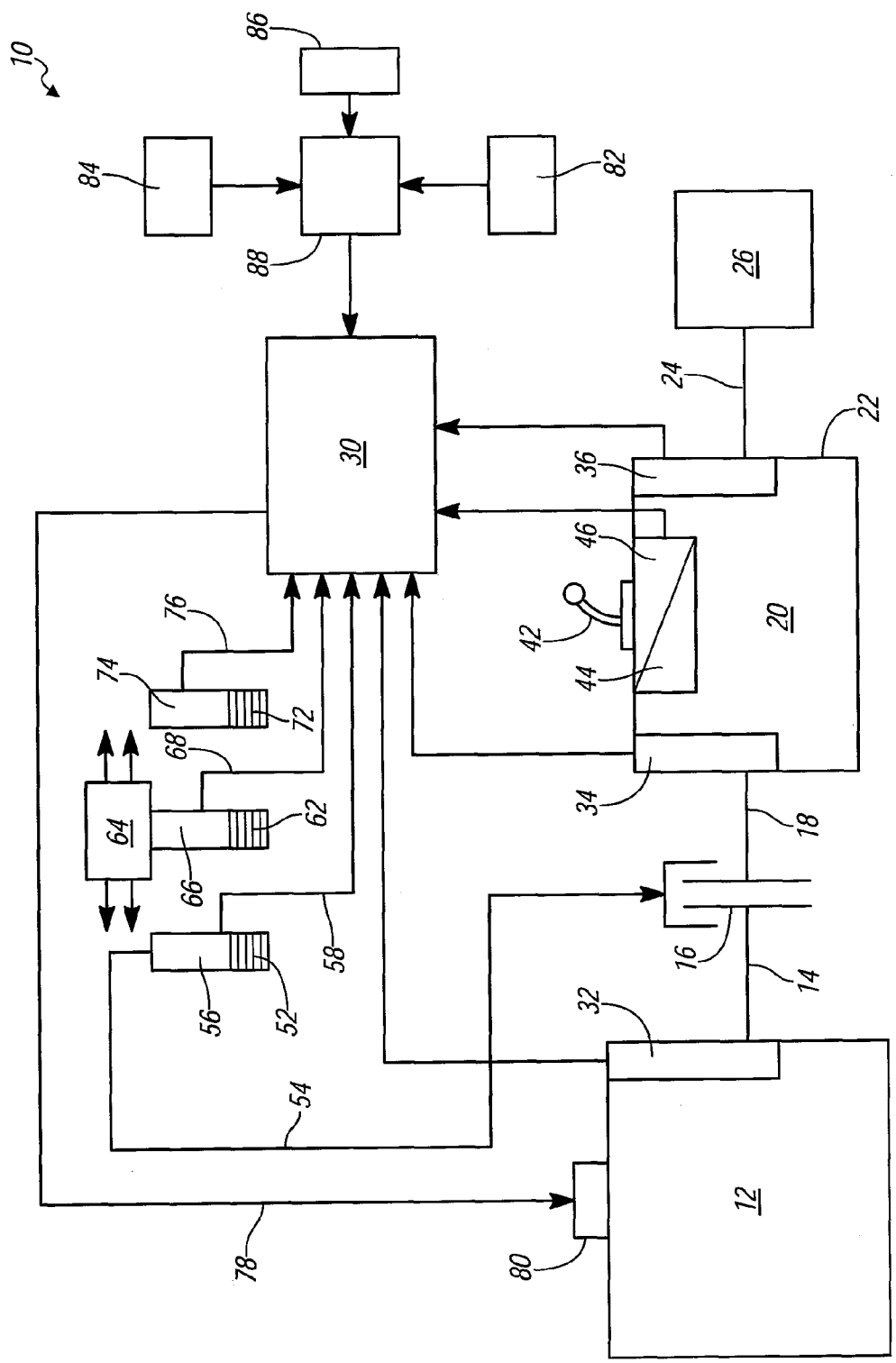
FIG. 1 is a schematic diagram of the relevant electric, electronic, electromechanical and mechanical components of a motor vehicle equipped with a manual transmission and the present invention.

With reference to FIG. 1, the relevant electric, electronic, electromechanical and mechanical components of a motor vehicle equipped with a manual transmission and the present invention are illustrated and generally designated by the reference number 10. The significant mechanical components 10 include a prime mover 12 which may be a gasoline, Diesel or flex-fuel engine, or a hybrid or electric power plant. The prime mover 12 includes an output shaft 14 which drives a main friction clutch 16 which is typically engaged and dis-engaged by the vehicle operator (not illustrated). The main clutch 16, which may be either mechanically or hydraulically operated, selectively provides drive torque to an input shaft 18 of a manual transmission 20. The manual transmission 20 may be conventional and includes a housing 22 as well as shafts, gears, bearings and synchronizers (all not illustrated) which cooperatively provide, for example, four, five, six or more forward speeds or gear ratios and reverse. The transmission 20 includes an output shaft 24 which is coupled to a final drive assembly 26 which may include, for example, a propshaft, a differential assembly and a pair of drive axles.

The components 10 also include a plurality of electric and electronic sensors which provide real time data to an engine control module (ECM) or similar device. An electronic speed sensor (tachometer) 32 is disposed in sensing relationship with the output shaft 14 of the prime mover 12 and provides a signal representing the instantaneous speed of the prime mover 12 to the control module 30. Likewise, an optional transmission input shaft speed sensor (TISS) 34, disposed in sensing relationship with the input shaft 18 of the transmission 20, provides a signal representing the instantaneous speed of the input shaft 18 to the control module 30 and a transmission output speed sensor (TOSS) 36, disposed in sensing relationship with the output shaft 24 of the transmission 20, provides a signal representing the instantaneous speed of the output shaft 24 to the control module 30. The transmission input shaft speed sensor 34 is optional because the speed of the input shaft 18 can be computed by simple multiplication from the known speed of the output shaft 24 and ratio of the currently selected or about to be selected gear.

The transmission 20 includes a manual gear shift lever 42 which is manipulated by the vehicle operator to select a desired gear (or speed ratio) and is coupled to a gear absolute shift position sensor assembly 44 which preferably includes an application specific integrated circuit (ASIC) 46, the data output or which is supplied to the control module 30 and which indicates the current position of the shift lever 42.

The mechanical and electro-mechanical components 10 include a clutch pedal 52 which is linked through a line 54 to the main clutch 16 and includes a clutch pedal position sensor 56 which provides a signal in a line 58 representing the instantaneous position of the clutch pedal 52 to the control module 30. Likewise, a brake pedal 62 is linked to an anti-lock braking system (ABS) module 64 which provides braking signals and/or pressures to the four wheels of the vehicle and includes a brake pedal position sensor 66 which provides a signal in a line 68 representing the instantaneous position of the brake pedal 62 to the control module 30. Additionally, in a typical and contemporary drive-by wire engine configuration, an accelerator or throttle pedal 72 includes a throttle pedal position sensor 74 which provides a signal in a line 76 representing the instantaneous position of the throttle pedal 72 to the control module 30. This information, as well as other engine control signals according to the present invention, are provided in a line or lines 78 to one or more control devices 80 associated with the prime mover 12. These control devices 80 adjust the speed of the prime mover 12 up or down and may include the throttle, active fuel management, that is, controlling the quantity of fuel to the engine or one or more cylinders, spark advance, as well as cam phasing, intake manifold tuning, port deactivation, exhaust gas recirculation, related methods and combinations thereof.

The pedal position sensors 56, 66 and 74 may be any resistive, magnetic, PWM, linear variable displacement transformer (LVDT), permanent magnet linear contactless displacement (PLOD), Hall effect or other type of sensor providing an essentially analog, i.e., continuous, output from 0 to 100% of a variable as the pedal travels from an at rest (unactivated) position to a fully depressed (fully activated) position.

The components 10 may also include a driver interface 82 which generally includes those switches, controls and devices under the supervision of and operated by the vehicle operator. For example, a switch of the driver interface 82 may manually activate and de-activate the present rev matching system. Additionally, the vehicle may include lateral and longitudinal accelerometers 84 which provide data in real time regarding the instantaneous acceleration in the X-Y plane the vehicle is experiencing as well as a steering angle sensor 86. Preferably, data and signals from the driver interface 82, the lateral and longitudinal accelerometers 84 and the steering angle sensor 86 are provided to a body control module (BCM) 88 or similar control module which acts as a centralized operational destination for such signals and data and which provides selected signals and data to the control module 30.

Figure 2:
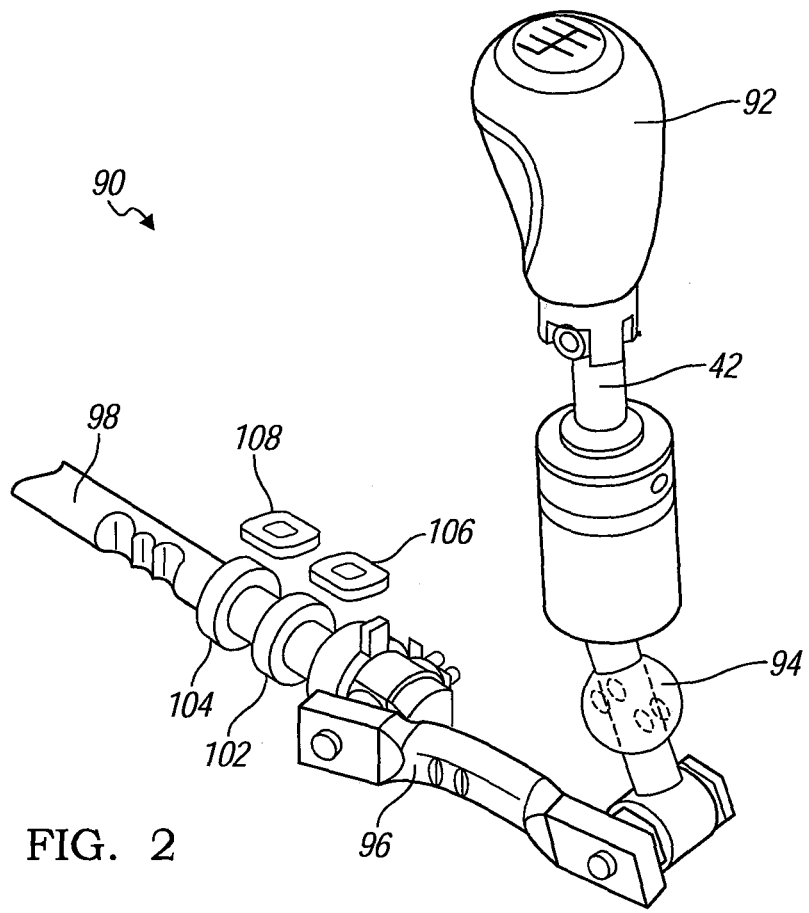
FIG. 2 is a perspective view of a manual transmission shift lever and gear absolute position sensor assembly according to the present invention.

Referring now to FIG. 2, the manual gear shift lever 42 is a component of a shift linkage 90 that includes a shift handle 92 and a shift ball or pivot 94 and a link 96 which couples the motion of the gear shift lever 42 to a shaft 98 extending into the transmission 20 which translates both axially and rotationally. The shift lever 42 is moveable through a virtual or actual shift gate or "H" pattern which facilitates selection of, separates and creates tactile feedback for a number of forward gears or speed ratios and reverse. The gear absolute shift position sensor assembly 44 includes a first arc magnet or ring 102 and an axially spaced apart second arc magnet or ring 104, both secured to the shaft 98. In the neutral position of the shift linkage 90, a first Hall effect sensor 106 is disposed proximate the first arc magnet 102 and a second Hall effect sensor 108 is disposed proximate the second arc magnet 104. The outputs of the first Hall effect sensor 106 and the second Hall effect sensor 108 are fed directly to the application specific integrated circuit 46 which may be fabricated and integrated with the sensors 102 and 104 into a unitary device.

Alternatively, a single arc magnet or ring and a proximate single three dimensional (3D) Hall effect sensor may be utilized in place of the two arc magnets 102 and 104 and the two Hall effect sensors 106 and 108. In either case, it should be appreciated that the gear absolute position sensor assembly 44 provides instantaneous data or signals indicating the actual, current position of the shift lever 42 as it travels in the "H" shift pattern from one gear, through neutral, to another gear. That is, not only are data or signals regarding selected, discrete gears provided, but also data or signals indicating any and all current intermediate positions are provided.

As an alternative to Hall effect sensors, anisotropic magneto resistance (AMR), giant magneto resistance (GMR), permanent magnet linear contactless displacement (PLOD), linear variable displacement transformer (LVDT), magneto elastic (ME) or magneto inductive (MI) sensors may be utilized. Further details of the gear absolute shift position sensor assembly 44 and the shift linkage 90 may be found in U.S. Pat. No. 8,739,647 B2 which is incorporated herein by reference.

Figure 3:
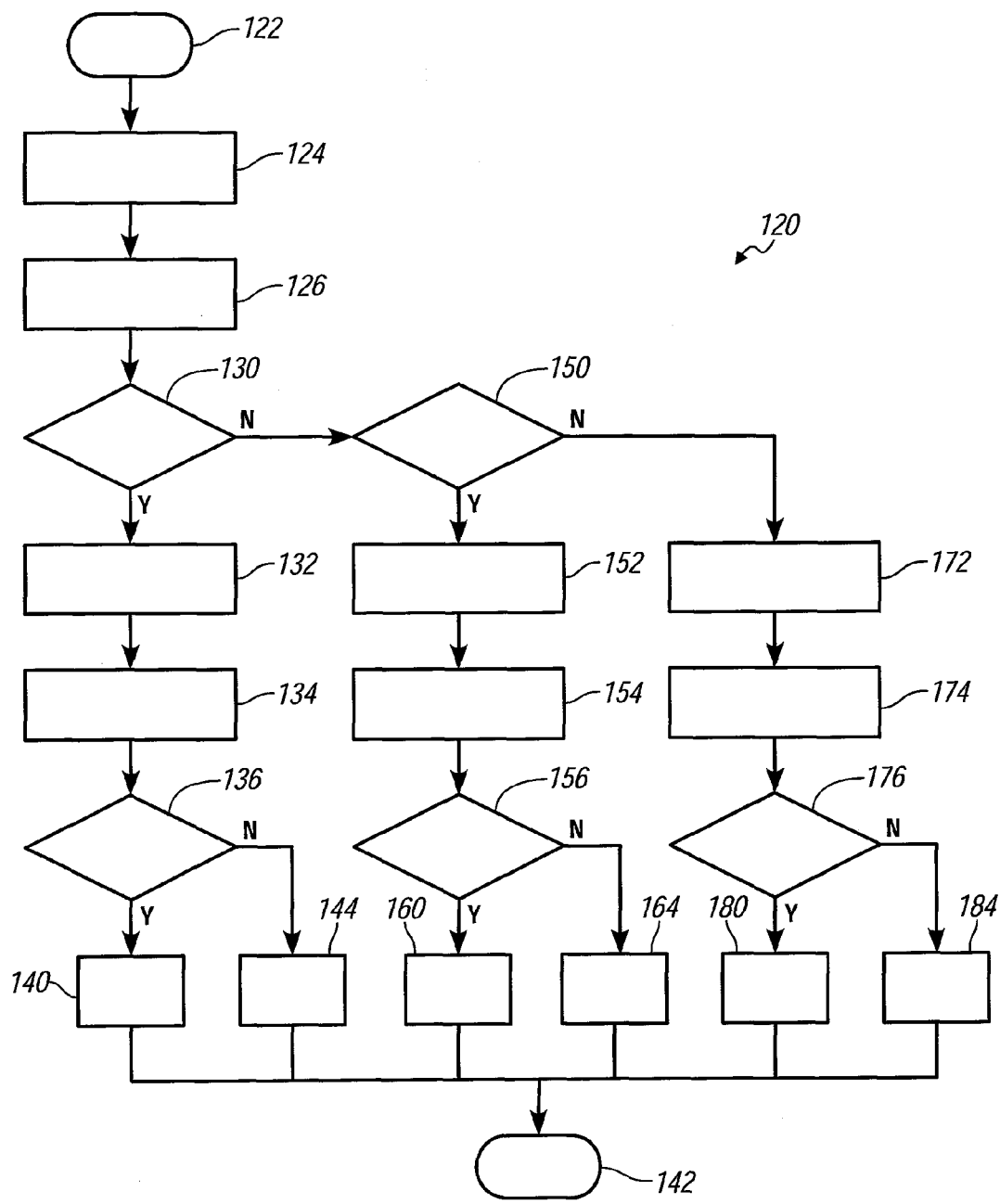
FIG. 3 is a flow chart illustrating the logic and computational steps of the variable rev or speed matching method according to the present invention.

Referring now to FIG. 3, a program setting forth the steps of the method of variable rev or speed matching according to the present invention is designated by the reference number 120. The program 120 begins with an initializing step 122 that clears certain registers and undertakes other normalizing activities and moves to an process step 124 that polls or reads one or more of the sensors such as the throttle position sensor 74, the brake position sensor 66, the clutch position sensor 56, the gear absolute shift position sensor assembly 44, the lateral and longitudinal accelerometers 84 and the steering angle sensor 86. The program 120 then moves to a process or computation step 126 in which first, second or higher order derivatives are calculated for one or more of the current values provided by the throttle position sensor 74, the brake position sensor 66, the clutch position sensor 56, the gear absolute shift position sensor assembly 44 and the lateral and longitudinal accelerometers 84. Typically, the value of the steering angle sensor 86 is not differentiated as will be explained below.

These first, second or higher order derivative values are then analyzed according to one of several schemes or hierarchies to arrive at a value or values that can be utilized to determine which of two, three or more operating modes should be selected to match the vehicle driver's current activity. For example, a first approach places primary importance on the data (derivatives) from the lateral accelerometer 84, the clutch pedal sensor 56 and the gear shift sensor assembly 44 and less or little importance on the data (derivatives) from the remaining sensors.

A second approach provides a weighted average of this data, that is, the data (derivatives) from each sensor are weighted by multiplying them by a distinct predetermined factor and the values summed. In this way, greater significance may be accorded to certain data such as that from the gear shift sensor assembly 44 or the brake pedal position sensor 66, somewhat less to, for example, the accelerator pedal position sensor 74 or the lateral accelerometer 84 and less still to, for example, the longitudinal accelerometer 84 or the clutch pedal position sensor 56.

A third approach establishes one or more threshold values corresponding to the two, three or more operating modes of the system. When one or a defined number of the derivatives exceed a threshold value corresponding to one of the defined operational modes, that operational mode is selected by the program 120. In yet another configuration, all or a selected plurality of the derivatives may simply be summed, the larger values contributing more to a total that is then utilized to determine the operating mode. It should be understood that undifferentiated data from the steering angle sensor 86, when the indication is a significant or relatively marked front wheel angle to either the left or the right, may be utilized to override all other data and place the system in the least aggressive driving mode, i.e., "touring" in the present example.

Given these above-discussed computations, the program 120 enters a decision point 130 which enquires whether the selected, weighted or summed derivative value or values are greater than a first, predetermined value or values. If it or they are, the decision point 130 is exited at YES and a flag is set in a process step 132 indicating the system is operating in the most aggressive mode, here denominated "TRACK." Setting the flag in the step 132 may provide a signal to other systems and modules in the vehicle such as the body control module 88 and may illuminate an indicator light or icon on the dashboard or instrument panel informing the driver that the system is operating in the "TRACK" mode. Next, the current speeds of the prime mover 12 and the output shaft speed of the transmission 20 are read in a process step 134. Also, any further activity of the shift lever 42 such as motion into or out of a gear and the speed of such motion is read.

Then, another decision point 136 is entered and, depending upon the current activity of the shift lever 42, the control module 30 determines that either an upshift or downshift is about to be undertaken. If an upshift is determined, the decision point 136 is exited at YES. If it is determined that a downshift is about to be undertaken, the decision point 136 is exited at NO. A YES response leads to a process step 140 which commands and completes a speed decrease of the prime mover 12 to achieve rev matching between the output shaft 14 of the prime mover 12 and the input shaft 18 of the transmission 20 within a first, shortest period of time. It should be understood that since the "TRACK" mode of operation is the most aggressive, this time period will be the shortest of the two, three or more rev matching times commanded and achieved by the present invention. While this time may change given the many variables between vehicles such as weight, horsepower, torque, transmission gears and drivetrain configuration, for example, for purposes of description and comparison a nominal value of 300 milliseconds and a range of from 200 to 400 milliseconds or more or less may be considered functional.

The program 120 then terminates at an end point 142 and may be repeated according to iterative cycle times established by, for example, the control module 30 or other vehicle control module or system.

If it is determined that an upshift is not taking place, that is, that a downshift is taking place, the decision point 136 is exited at NO which leads to a process step 144 which commands and completes a speed increase of the prime mover 12 to achieve rev matching between the output shaft 14 of the prime mover 12 and the input shaft 18 of the transmission 20 within the same first, shortest period of time. Again, it should be understood that since the "TRACK" mode of operation is the most aggressive, this time period will be the shortest of the two, three or more rev matching times commanded and achieved by the present invention. This first, shortest time period is subject to the same considerations recited above and will preferably have the same nominal value of 300 milliseconds and a range of from 200 to 400 milliseconds or more or less.

The program 120 then concludes at the end point 142 and may be repeated according to iterative cycle times established by, for example, the control module 30 or other vehicle control module or system.

Returning to the decision point 130, if the selected, weighted or summed derivative value or values are less than a predetermined value or values, the decision point 130 is exited at NO and the program 120 enters another decision point 150 which enquires whether the selected, weighted or summed derivative value or values are greater than a second, smaller predetermined value or values. If it or they are, the decision point 150 is exited at YES and a flag is set in a step 152 indicating the system is operating in a less aggressive mode, here denominated "SPORT." Setting the flag in the step 152 may provide a signal to other systems and modules in the vehicle such as the body control module 88 and may illuminate an indicator light or icon on the dashboard or instrument panel informing the driver that the system is operating in the "SPORT" mode. Next, the current speeds of the prime mover 12 and the output shaft speed of the transmission 20 are read in a step 154. Any further activity of the shift lever 42 such as motion into or out of a gear may also be read.

Then, another decision point 156 is entered and, depending upon the current activity of the shift lever 42, the control module 30 determines that either an upshift or downshift is about to be undertaken. If an upshift is determined, the decision point 156 is exited at YES. If it is determined that a downshift is about to be undertaken, the decision point 156 is exited at NO. A YES response leads to a process step 160 which commands and completes a speed decrease of the prime mover 12 to achieve rev matching between the output shaft 14 of the prime mover 12 and the input shaft 18 of the transmission 20 within a second, longer period of time. It should be understood that since the "SPORT" mode of operation is less aggressive than the "TRACK" mode, this rev matching time period will be longer than the period of time in the "TRACK" mode but shorter than the rev matching times in the additional, still less aggressive mode or modes described subsequently. While this time may change given the many variables between vehicles such as weight, horsepower, torque, transmission gears and drivetrain configuration, for example, for purposes of description and comparison a nominal value of 500 milliseconds and a range of from 400 to 600 milliseconds or more or less may be considered functional.

The program 120 then terminates at an end point 142 and may be repeated according to iterative cycle times established by, for example, the control nodule 30 or other vehicle control module or system.

If it is determined that an upshift is not taking place, that is, that a downshift is taking place, the decision point 156 is exited at NO which leads to a process step 164 which commands and completes a speed increase of the prime mover 12 to achieve rev matching between the output shaft 14 of the prime mover 12 and the input shaft 18 of the transmission 20 within the same second, longer period of time. Again, it should be understood that since the "SPORT" mode of operation is less aggressive than the "TRACK" mode, this rev matching time period will be longer than the period of time in the "TRACK" mode but shorter than the rev matching times in the additional, still less aggressive mode or modes. This second, longer time period is subject to the same considerations recited above and will preferably have the same nominal value of 500 milliseconds and a range of from 400 to 600 milliseconds or more or less.

The program 120 then concludes at an end point 142 and may be repeated according to iterative cycle times established by, for example, the control module 30 or other vehicle control module or system.

Returning to the decision point 150, if the selected, weighted or summed derivative value or values are less than the second, smaller predetermined value or values, the decision point 150 is exited at NO and a flag is set in a process step 172 indicating the system is operating in a still less aggressive mode, here denominated "TOURING." As stated above, setting the flag in the step 172 may provide a signal to other systems and modules in the vehicle such as the body control module 88 and may illuminate an indicator light or icon on the dashboard or instrument panel informing the driver that the system is operating in the "TOURING" mode. Next, the current speeds of the prime mover 12 and the output shaft speed of the transmission 20 are read in a step 174. Any further activity of the shift lever 42 such as motion into or out of a gear may also be read.

Then, another decision point 176 is entered and, depending upon the current activity of the shift lever 42, the control module 30 determines that either an upshift or downshift is about to be undertaken. If an upshift is determined, the decision point 176 is exited at YES. If it is determined that a downshift is about to be undertaken, the decision point 176 is exited at NO. A YES response leads to a process step 180 which commands and completes a speed decrease of the prime mover 12 to achieve rev matching between the output shaft 14 of the prime mover 12 and the input shaft 18 of the transmission 20 within a third, still longer (or longest) period of time. It should be understood that since the "TOURING" mode of operation is less aggressive than the "SPORT" mode, this rev matching time period will be longer than the period of time in the "SPORT" mode but shorter than the rev matching times in any additional, still less aggressive mode or modes. While this time may change depending upon the many variables between vehicles recited above, for purposes of description and comparison a nominal value of 800 milliseconds and a range of from 700 to 900 milliseconds or more or less may be considered functional.

The program 120 then terminates at an end point 142 and may be repeated according to iterative cycle times established by, for example, the control nodule 30 or other vehicle control module or system.

If it is determined that an upshift is not taking place, that is, that a downshift is taking place, the decision point 176 is exited at NO which leads to a process step 184 which commands and completes a speed increase of the prime mover 12 to achieve rev matching between the output shaft 14 of the prime mover 12 and the input shaft 18 of the transmission 20 within the same third, longest period of time. Again, it should be understood that since the "TOURING" mode of operation is less aggressive than the "SPORT" mode, this rev matching time period will be longer than the period of time in the "SPORT" mode but shorter than the rev matching times in any additional, still less aggressive mode or modes. This third, longest time period is subject to the same considerations recited above and will preferably have the same nominal value of 800 milliseconds and a range of from 700 to 900 milliseconds or more or less.

The program 120 then concludes at an end point 142 and may be repeated according to iterative cycle times established by, for example, the control module 30 or other vehicle control module or system.

It should be understood that while in the above description, three operating modes, "TRACK," "SPORT," and "TOURING" having decreasing degrees of aggressive rev matching have been disclosed and described, a system having additional rev matching time periods corresponding to four, five or more modes which provide correspondingly higher resolution of driver aggressiveness and prime mover response thereto are considered to be well within the scope of this invention and claims. In this regard, it should also be understood that the number of operating modes may be increased to the extent that the system operates essentially as a fully proportional system, matching, i.e., proportioning, the rev matching time period to the degree of driver aggressiveness sensed by the sensors 44, 56, 66, 74 and 84 and determined by the control module 30.

Figure 4:
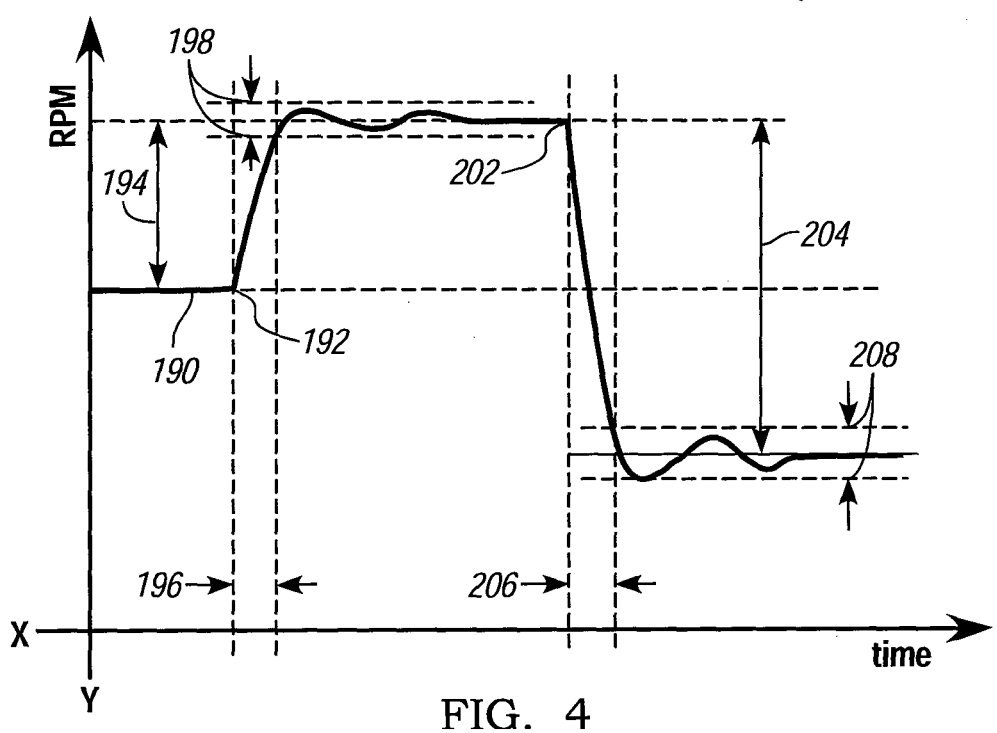
FIG. 4 is a graphical representation of the typical operation of the rev or speed matching achieved by the present invention.

Referring now to FIG. 4, a graphic and qualitative representation of speed or rev matching is illustrated. The Y axis represents speed (RPM) of a prime mover 12 and the X axis represents time. The dark line 190 represents the speed of the prime mover 12 over time as a manual transmission 20 undergoes first a downshift at a point 192. The present invention commands an increase in the speed of the engine or prime mover 12 represented by the line 194 beginning at the point 192 and the speed increases in the time interval 196 to match, within an acceptable tolerance represented by the dashed lines 198, the speed of the input shaft 18 of the transmission 20. Subsequently, an upshift begins at a point 202. The present invention commands a decrease in the speed of the engine or prime mover 12 represented by the line 204 beginning at the point 202 and the speed decreases in the time interval 206 to match, within an acceptable tolerance represented by the dashed lines 208, the speed of the input shaft 18 of the transmission 20.

The description of the invention is merely exemplary in nature and variations that do not depart from the gist of the invention are intended to be within the scope of the invention. Such variations are not to be regarded as a departure from the spirit and scope of the invention.

What is claimed is:

1. A variable rate speed matching system for a motor vehicle driveline comprising, in combination,
    a prime mover having an output shaft and an output shaft speed sensor,
    a manual transmission having an input shaft, an output shaft and an output shaft speed sensor,
    at least one vehicle accelerometer,
    at least one position sensor coupled to one of a brake pedal, a clutch pedal and a throttle pedal,
    a gearshift position sensor,
    a control module having inputs for receiving data from said sensors and said accelerometer, a microprocessor for calculating derivatives of certain of said data, comparing and classifying said derivatives into at least a first, aggressive driving mode and a second, less aggressive driving mode, and providing a first output to said prime mover corresponding to said first mode for synchronizing a speed of said prime mover output shaft and said manual transmission input shaft in a first, shorter period of time and a second output to said prime mover corresponding to said second mode for synchronizing a speed of said prime mover output shaft and said manual transmission input shaft in a second, longer period of time.

2. The variable rate speed matching system for a motor vehicle driveline of claim 1 further including a clutch disposed between said output shaft of said prime mover and said input shaft of said manual transmission.

3. The variable rate speed matching system for a motor vehicle driveline of claim 1 further including an additional accelerometer having an output provided to said control module.

4. The variable rate speed matching system for a motor vehicle driveline of claim 1 wherein said microprocessor additionally compares and classifies said derivatives into a third, still less aggressive mode and provides a third output to said prime mover corresponding to said third mode for synchronizing a speed of said prime mover output shaft and said manual transmission input shaft in a third, still longer period of time.

5. The variable rate speed matching system for a motor vehicle driveline of claim 1 wherein said gearshift position sensor provides data regarding both gear positions and intermediate positions.

6. The variable rate speed matching system for a motor vehicle driveline of claim 1 wherein said microprocessor provides an output indicating operation in said first mode or said second mode.

7. The variable rate speed matching system for a motor vehicle driveline of claim 1 further including a steering angle position sensor.

8. A variable rate speed matching system for a motor vehicle driveline comprising, in combination,
    a prime mover output shaft speed sensor,
    a manual transmission output shaft speed sensor,
    a vehicle accelerometer,
    at least one position sensor coupled to one of a brake pedal, a clutch pedal and a throttle pedal,
    a gearshift position sensor,
    a control module having inputs for receiving data from said sensors and said accelerometer, a microprocessor for calculating derivatives of certain of said data, comparing and classifying said derivatives into at least a first, aggressive driving mode and a second, less aggressive driving mode and providing a first output to said prime mover corresponding to said first mode for synchronizing a speed of said prime mover and an input of said manual transmission in a first, shorter period of time and a second output to said prime mover corresponding to said second mode for synchronizing the speed of said prime mover and the input of said manual transmission in a second, longer period of time.

9. The variable rate speed matching system for a motor vehicle driveline of claim 8 wherein said microprocessor additionally compares and classifies said derivatives into a third, still less aggressive mode and provides a third output to said prime mover corresponding to said third mode for synchronizing the speed of said prime mover and the input of said manual transmission in a third, still longer period of time.

10. The variable rate speed matching system for a motor vehicle driveline of claim 8 wherein said gearshift position sensor provides data regarding both gear positions and intermediate positions.

11. The variable rate speed matching system for a motor vehicle driveline of claim 8 wherein said microprocessor provides an output indicating operation in said first mode or said second mode.

12. The variable rate speed matching system for a motor vehicle driveline of claim 8 further including a steering angle position sensor.

13. A method of variable rate speed matching for a motor vehicle driveline, comprising the steps of:
    providing a prime mover and an output shaft speed sensor,
    providing a manual transmission output shaft speed sensor,
    providing a vehicle accelerometer,
    providing at least one position sensor coupled to one of a brake pedal, a clutch pedal and a throttle pedal,
    providing a gearshift position sensor,
    providing signals from said sensors and said accelerometer to a computational module, calculating derivatives of certain of said signals, comparing and classifying said derivatives into a first, aggressive driving mode and a second, less aggressive driving mode, providing a first output to said prime mover corresponding to said first mode for synchronizing a speed of said prime mover and an input of said manual transmission in a first, shorter period of time and a second output to said prime mover corresponding to said second mode for synchronizing the speed of said prime mover and the input of said manual transmission in a second, longer period of time.

14. The method of variable rate speed matching for a motor vehicle driveline of claim 13 further including a step of comparing and classifying said derivatives into a third, still less aggressive mode and providing a third output to said prime mover corresponding to said third mode for synchronizing said speed of said prime mover and said input of said manual transmission in a third, still longer period of time.

15. The method of variable rate speed matching for a motor vehicle driveline of claim 13 further including a step of providing a steering angle sensor and inhibiting action of said computational module based upon data from said steering angle sensor.

16. The method of variable rate speed matching for a motor vehicle driveline of claim 13 further including a step of providing a third output to said prime mover corresponding to a third mode for synchronizing said speed of said prime mover and said input of said manual transmission in a third, still longer period of time.

17. The method of variable rate speed matching for a motor vehicle driveline of claim 13 wherein said gearshift position sensor provides data regarding both gear positions and intermediate positions.

\* \* \* \* \*